United States Patent
Bollinger et al.

(10) Patent No.: US 6,736,700 B2
(45) Date of Patent: May 18, 2004

(54) PROCESS AND DEVICE FOR THE REGISTRATION OF THE STATE OF WEAR OF TOOLS EMPLOYED IN GEAR MANUFACTURE

(75) Inventors: Oskar Bollinger, Pfungen (CH); Steven Bruppacher, Wallisellen (CH); Wolfgang Thyssen, Wallisellen (CH)

(73) Assignee: Reishauer AG, Wallisellen (CH)

( * ) Notice: Subject to any disclaimer, the term of this patent is extended or adjusted under 35 U.S.C. 154(b) by 0 days.

(21) Appl. No.: 10/199,326

(22) Filed: Jul. 22, 2002

(65) Prior Publication Data

US 2003/0031522 A1 Feb. 13, 2003

(30) Foreign Application Priority Data

Jul. 20, 2001 (DE) .......................................... 101 35 531

(51) Int. Cl.$^7$ ................................................. B24B 1/00
(52) U.S. Cl. .......................................................... 451/5
(58) Field of Search ................................ 451/21, 5, 56, 451/443, 47; 409/234, 80, 8; 408/116, 16; 279/126

(56) References Cited

U.S. PATENT DOCUMENTS

| | | | | |
|---|---|---|---|---|
| 3,858,892 A | * | 1/1975 | Rutschke et al. | 279/9.1 |
| 4,420,253 A | * | 12/1983 | Pryor | 356/237.1 |
| 4,588,339 A | * | 5/1986 | Bilz | 409/234 |
| 4,773,800 A | * | 9/1988 | Furuhashi et al. | 409/234 |
| 4,809,426 A | * | 3/1989 | Takeuchi et al. | 365/64 |
| 4,886,009 A | * | 12/1989 | Gondar et al. | 116/208 |
| 4,890,306 A |   | 12/1989 | Noda | |
| 5,591,065 A | * | 1/1997 | Mizuno et al. | 451/47 |
| 5,692,998 A | * | 12/1997 | Weigel | 483/12 |
| 5,904,457 A |   | 5/1999 | Suwijn et al. | |
| 6,250,295 B1 | * | 6/2001 | Chanton et al. | 125/15 |
| 6,379,217 B1 | * | 4/2002 | Thyssen | 451/5 |
| 6,497,610 B1 | * | 12/2002 | Reichert | 451/5 |

FOREIGN PATENT DOCUMENTS

| | | | |
|---|---|---|---|
| DE | 3831900 | 4/1989 | |
| DE | 4116487 | 11/1992 | |
| EP | 1 043 118 A1 | 10/2000 | |
| FR | 301 931 | * 2/1989 | ......... G05B/19/405 |
| FR | 2613267 | 10/1998 | |

OTHER PUBLICATIONS

Von Thomas Buchholz et al., "Methoden una verrahren, für die Werkzeugüberwachung in der flexiblen Fertigung", *FERTIGUNGSTECHNIK*, vol. 130, No. 12, (1988).

* cited by examiner

*Primary Examiner*—George Nguyen
(74) *Attorney, Agent, or Firm*—Browdy and Neimark, P.L.L.C.

(57) ABSTRACT

In a process for the registration of the state of wear of a tool used in gear manufacture, where the tool has at least one abrasive tooth tip for machining a workpiece in a machining process, a cutting distance per tooth tip of the tool is determined, and this cutting distance, weighted with a wear intensity factor, compared with a specified life path constant. This life path constant indicates the maximum acceptable state of wear of the tool for the machining of the workpiece. By way of this process the wear behaviour can be registered, and a total and residual piece potential determined.

16 Claims, 2 Drawing Sheets

PROCESS AND DEVICE FOR THE REGISTRATION OF THE STATE OF WEAR OF TOOLS EMPLOYED IN GEAR MANUFACTURE

DESCRIPTION

1. Technical Field

The invention concerns a process and a device for the registration of the state of wear of tools employed in gear manufacture.

In particular the invention concerns the registration of the state of wear of profiling tools which are employed for profiling machining tools, the machining tools being used for the continuous generation and profile grinding process and/or for gear honing. Such machining tools are in particular grinding worms and honing rings, and such profiling tools are in particular abrasive coated dressing discs and profiling gears.

2. Background of the Invention

On account of the high cost of tooling in gear manufacture, there is a need to supervise tool consumption, to make it controllable by calculation, and to make the different tools amenable to mutual comparison. This applies especially to the profile grinding and gear honing initially mentioned.

The state of wear of tools employed in gear manufacture cannot be checked by measurement. Moreover the development of wear on these tools and the factors influencing it are relatively complex. A registration of data is however made more difficult by the complexity of the machining process, and hence by the abundance of data. The difficulty in acquiring reliable data about the effective wear behaviour of these tools from use in industrial production is increased even more by the varying nature of use of the tools with frequent fresh set-ups on different machines by different setters and operators, and the changing conditions for different diameters of the tools to be profiled. Yet the knowledge of the state of wear and the effective piece potential of these tools is essential both for an efficient tool management and for optimizing the conditions of use, as well as for the technical further development of the tools by the tool manufacturer. Furthermore, the profiling tools in particular often have a very long life and are employed on a wide variety of machines, which in turn makes the registration, the supervision and the exchange of data still more difficult.

Tool consumption has hitherto been measured simply by the number of workpieces produced. This characteristic quantity certainly offers the advantage that the proportion of tooling costs per workpiece can be easily calculated, but has the disadvantage that in the event of the calculated number of workpieces produced not being attained the causes of the deviation are not discernible. In particular it offers no information as to whether or how severely grinding or honing tools have been "over-profiled". "Over-profiling" means, for example, avoidable initial profiling or intermediate profiling operations which contribute to profiling tool wear without workpieces having been produced, or profiling operations under unsuitable profiling conditions that increase tool wear, which likewise results in a reduction of the piece potential. Piece potential is understood as the number of workpieces produced during the entire period of use of the machining tool.

For tools used in gear manufacture, a detailed determination of wear behaviour is thus only possible when on the one hand the tool consumption can be expressed by calculation, and on the other hand the actual state of wear of the tool can be assessed.

Various methods are known by which tool data can be registered, stored, and applied for optimizing the use, for the tool management and for further development of the tools.

On machining centres especially, for example, the tools or their tool holders are often provided with an electronic data carrier, from which the stored data can be read by a machine control system via a write/read unit, and on which the machine control system can write other tool or process data. For machine tools such as are encountered in gear manufacture, however, the use of suitable data carriers integrated in the tool or tool holder is impossible. The storage capacity of integrated data carriers is insufficient for the abundance of data involved.

EP-A-1,043,118 presents further a process for registering information on the use of a tool, by which the use data of the tool is processed in a data bank of the machine control system and transmitted to tool management or to a tool manufacturer either via a data network or by a data carrier copy. This solution presumes that an appropriate data structure, a suitable storage organization as well as suitable data transfer channels are available, in order to assure the registration and transmission of the entire relevant use data of a tool, even in the case of extremely long tool life. In the case of gear manufacturing machines, especially for the profiling tools used in gear manufacture, this is very complicated and extravagant, and is hence not available here.

Furthermore no process is as yet known, by which the piece potential of profiling tools on machines operating by the continuous profile grinding method and/or by gear honing can be determined by calculation, and the actual state of wear assessed during use.

SUMMARY OF THE INVENTION

It is an object of the present invention to provide a process and a device for determining the state of wear of tools employed in gear manufacture, which obviate the above-mentioned disadvantages.

This object is achieved by a process and a device having the features of patent claims 1 and 13 respectively.

It is a further object of the invention to create a device for determining the state of wear, which allows an unambiguous allocation of a data carrier to the tool.

This object is achieved with a device having the features of claim 14.

The invention is rooted, on the one hand, in the finding that under invariable wear intensity the cutting distance travelled per abrasive coated surface until the tool is spent is largely of at least approximately constant magnitude, and moreover independent of the relevant tooth geometry of the tool. In the following this value is termed the life path constant. In the case of gear-shaped tools, a further finding applied is that the wear that governs the failure of the tool is concentrated at the tooth tip zone, even if both tooth tip and tooth flanks are subjected to the machining stress. It is further considered that the wear development of the tool progresses approximately linear relative to the cutting distance of the tooth tip, which is proportional to the momentary diameter of the grinding worm.

Basing on these findings, in the process according to the invention for registering the state of wear on a tool, the cutting distance per tooth tip is determined and, after weighting with a wear intensity factor, compared with the life path constant.

If the registered weighted cutting distance equals the life path constant, a maximum acceptable state of wear has theoretically been reached. If it is not yet equal to the life path constant, it is possible to derive the number of workpieces that can still be machined with this tool or with a machining tool prepared with this tool. This quantity is termed the residual piece potential. It is furthermore possible to derive evidence concerning the basic wear behaviour and an overall assessment of the tool, which permit conclusions as to useful and/or necessary improvement measures to the machining process, and also the residual piece potentials of the tool under unaltered or improved operating conditions.

The process and the device according to the invention are especially suitable for registering the state of wear of profiling tools which are employed for profiling gear grinding or honing tools. In particular they are suitable for profiling tools in the form of a gear, which are employed for profiling grinding worms used in continuous profile grinding. In this case, by way of the determined state of wear of the profiling tool, the total piece potential and residual piece potential of the grinding worm producing the workpieces can also be derived.

BRIEF DESCRIPTION OF THE DRAWINGS

In the following the invention is described in detail by the example of a profiling tool for grinding the teeth of spur and helical gears by the continuous profile grinding process, referring to the drawings. These show.

DETAILED DESCRIPTION OF THE PREFERRED EMBODIMENTS

Figure 1:
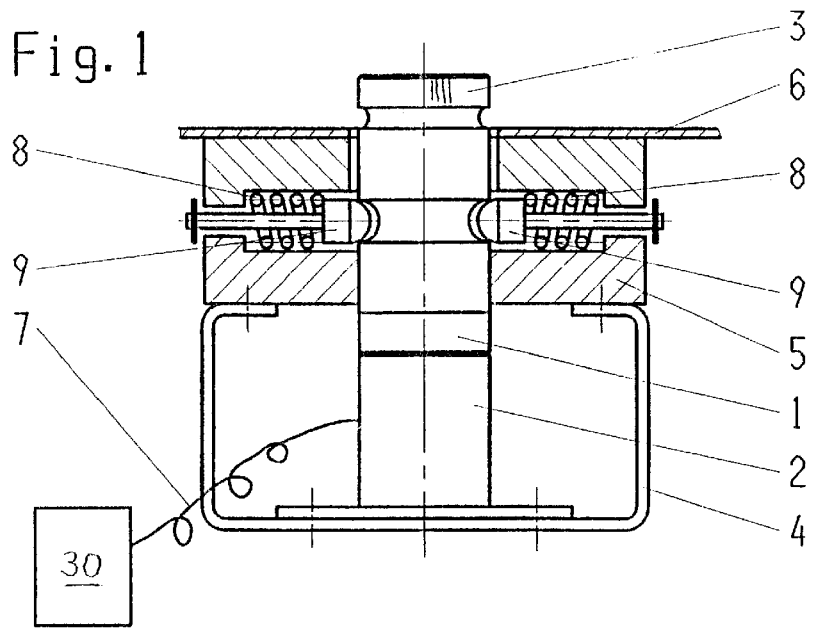
FIG. 1 a cross-section through a tool use data store unit and a write/read unit attached to a machine tool, FIG. 2 a cross-section through a transport box with a catch mechanism, in diagrammatic presentation, FIG. 3a a diagrammatic presentation of a tool and a grinding worm.

Although the invention concept can be applied for the determining and evaluation of the state of wear of both disc-shaped and gear-shaped tools, the following presentation of the invention considers, for greater clarity the more complicated case of gear-shaped tools only. The findings on which the invention is based and the steps in procedure according to the invention can be applied in the same sense to the simpler case of disc-shaped tools.

For grinding the teeth of spur and helical gears by the continuous profile grinding method, the machining tools employed are grinding worms. These grinding worms must be re-profiled regularly, so that the spur and helical gears can be produced within the specified tolerances. In general, re-profiling is performed after a pre-defined number of workpieces, in this case gears, have been produced. The number of workpieces grindable between two profiling operations is almost exclusively based on the loss in form of the grinding worm profile due to the volumetric wear, and on the increase in grinding forces with increasing wear.

Profiling is performed with a profiling tool, in particular a profiling gear, coated with abrasive grains, in particular diamond grains. Every machine tool embodies a profiling cycle which is repeated in short time intervals throughout the total period of use of this profiling tool, where the process setting data or parameters mostly remain unchanged over a number of cycles. This profiling cycle can be regarded as basic element of the wear burden on the profiling tool, whereby it is largely defined by a radial infeed amount, i.e. a radial tool infeed per profiling operation, and the number of workpieces produced between two profiling operations.

When a grinding worm is spent and cannot be re-profiled, a new grinding worm must be set up in the gear grinding machine. This must be pre-profiled by a pre-profiling amount governed by the profile depth before it can be used for grinding the spur and helical gears. Furthermore an intermediate profiling operation is necessary when the machine tool is re-set with an already profiled grinding worm, or when the profile of the grinding worm has been damaged due to an error.

Both during profiling and during pre-profiling the profiling tool is subjected to wear. Pre-profiling, however, is non-productive, as the wear thereby caused to the profiling tool is only indirectly profitable to the grinding of the workpieces, i.e. the gears, to be produced. But for the calculation of the manufacturing costs of the tool, these pre-profiling operations must also be considered.

During profiling, the profiling tools for profiling the grinding worms are under load both on the tooth tip and on the tooth flanks. On account of the varying cutting depth normal to the profiling coating, however, the wear is mostly concentrated at the tooth tip zone, where it generally begins at the end faces. It is thereby possible to refer all wear governing characteristics to the wear at the tooth tip corner.

According to the invention the tooth tip cutting distance travelled per tooth is thus used as a yardstick for the state of wear, or for the piece potential of the profiling tool up to its failure. The piece potential is defined as the number of workpieces, here gears, produced. The life path is the term given to the summed up tip cutting distance per tooth up to tool failure.

Figures 3A, 3B:
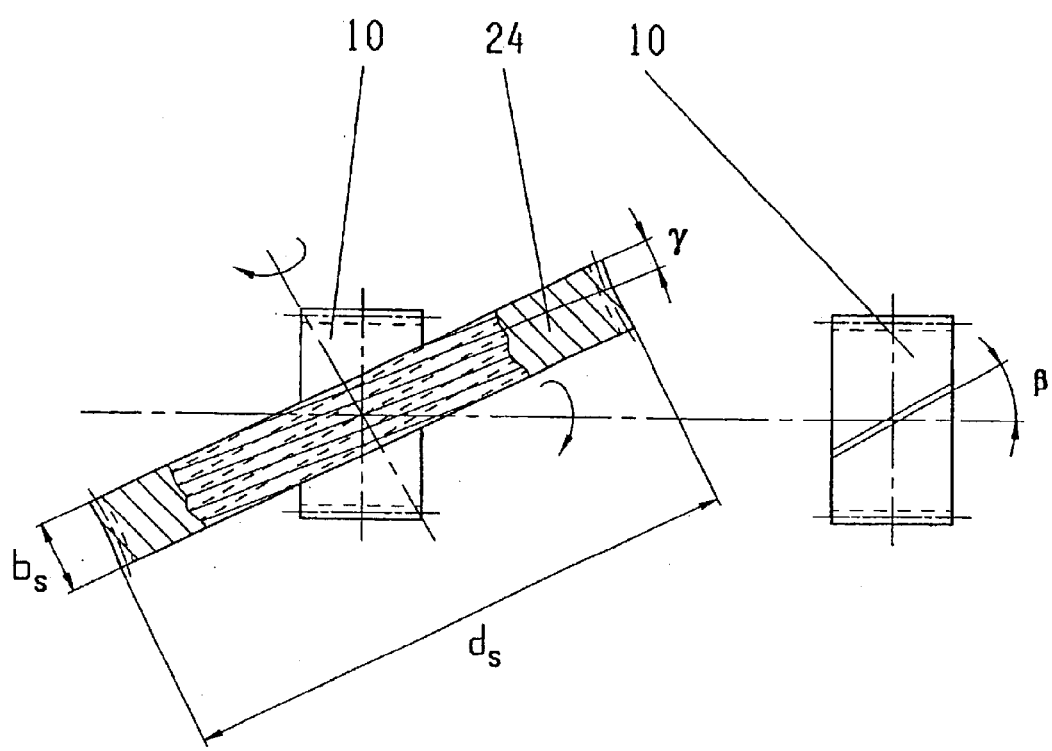
FIG. 3b a tool.

The tip cutting distance $1_{P1}$ travelled per tool tooth is given by the sum of the profiling infeed amounts, the profiling infeed per tooth, and the thread length of the grinding worm 24, which can be calculated from the grinding worm width $b_s$, the helix angle $\beta$ of the tool, and the number of starts $z_g$ on the grinding worm. The relevant characteristics are shown in the FIGS. 3a and 3b.

A sample calculation is given below:

Calculation of the tooth tip cutting distance of a diamond dressing gear

| TOOL MONITORING GRINDING | | |
|---|---|---|
| | Symbol | |
| Input data | | |
| Pre-profiling amount, radial | $a_{Psv}$ | 8 |
| Profiling amount (radial infeed per profiling operation) | $a_{Ps}$ | 0.25 |
| Profiling infeed rate, radial | $v_{Ps}$ | 1.5 |
| Min. grinding worm diameter | $d_{smin}$ | 270 |
| Grinding worm width | $b_s$ | 30 |
| Number of starts on grinding worm | $z_G$ | 3 |

-continued

| TOOL MONITORING GRINDING | | | |
|---|---|---|---|
| | Symbol | | |
| Grinding worm speed when profiling | $n_{sP}$ | 1671 | $n_{sP} = v_{sP}*60*1000/(\pi*d_{max})$ |
| Max. grinding worm diameter Diamond gear | $d_{smax}$ | 400 | |
| Normal module | $m_n$ | 1.75 | |
| Number of teeth | z | 35 | |
| Helix angle Calculation | β | 30 | |
| Grinding worm diameter (average) | $d_s$ | 327.00 | $d_s = (d_{smax} - 2*a_{Psv} + d_{smin})/2$ |
| Cutting speed for profiling | $v_{sP}$ | 28.61 | $v_{sP} = n_{sP}*\pi*d_s/(60*1000)$ |
| Lead angle of grinding worm thread | γ | 0.92 | $\gamma = \text{Arc tg}(m_n*z_G/d_s)$ |
| Crossed axes angle | Σ | 30.92 | $\Sigma = \gamma + \beta$ |
| Number of turns per grinding worm thread | $i_w$ | 8.76 | $i_w = b_s/(\sin\Sigma*\pi*m_n*(1/\cos\beta + z/2))$ |
| Diamond gear revolutions per profiling operation | $i_{DR\_P}$ | 23.87 | $i_{DR\_P} = a_{Ps}*n_{sP}*z_G/(v_{Ps}*Z)$ |
| Profiling cutting distance/diamond gear tooth tip per profiling operation | $l_{P1}$ | 214.94 | $l_{P1} = i_w*\pi*d_s*i_{DR\_P}/(\cos\gamma*1000)$ |
| Number of profiling operations per diamond gear | $i_{P\_DR\_ges}$ | 2630 | |
| Total profiling cutting distance per diamond wheel gear | $l_{P1DR\_ges}$ | 565292 | $l_{PDR\_ges} = l_{P1}*i_{P\_DR\_ges}$ |

Under optimum wear loading conditions of the profiling tool in production trials, a life path constant $1_{P1DRges}$ per tooth is determined empirically. This constant is largely independent of the geometry of the profiling tool and of the geometry of the workpiece to be produced. It is used in the process according to the invention as a measure for the maximum acceptable state of wear of the profiling tool. It thus serves as basis for the advance calculation of the piece potential of the profiling tool for any current machining case, from its tooling and process input data, where this value is weighted with a wear intensity factor $f_{vP}$ to adapt it to the wear loading conditions of the current case.

This wear intensity factor $f_{vP}$ takes into account the influence of the coating, especially the diamond interspersion of the profiling tool, the profiling infeed rate, and other wear related parameters specific to the case. The wear intensity factor $f_{vP}$ is likewise determined empirically in production trials.

To determine an actual value for the piece potential of the profiling tool in a current case on the machine, the data required for calculating a travelled profiling cutting distance, including all pre-profiling and profiling operations performed, as well as the number of workpieces produced, are registered continuously and stored on a data carrier 1 which accompanies the profiling tool. By means of appropriate computing software in a machine control system of the machine tool, or on an external computer, this data is applied to calculate a hitherto travelled pre-profiling and profiling cutting distance, weighted with the wear intensity factor $f_{vP}$ for the relevant profiling operation, and from the difference relative to the pre-calculated profiling life path a residual cutting distance is determined, which is converted to the corresponding residual number of profiling operations, and hence to a residual piece potential in still producible workpieces.

An evaluation of the data stored in the data carrier 1 at the end of the tool life, i.e. after maximum exploitation of the tool, yields a gapless picture on the expenditure of the tool for pre-profiling and profiling with the relevant process data and the corresponding number of workpieces produced over the entire period of use of the tool. These data thus supply an efficient basis both for a tool management and for process improvements during the period of use of the tool, as well as for tool development.

From the ratio between the cumulative actual cutting distances and the calculated cutting distances it is thus possible to determine, among other things, the degree of exploitation of the tool. Furthermore by comparing the pre-calculated cutting distance with the effective non-productive cutting distance absorbed in pre-profiling, by statistical registration of the ultimate diameters of the grinding worms, and by comparing the calculated and actual useful zones of the grinding worms, causes for an inadequate exploitation of the grinding worms and of the profiling tools can be discerned, and used to optimize tool application.

A preferred device for implementing the process is described in the following. This device can however also be employed in other processes to register the state of wear of tools. This device guarantees that every period of use of a tool is registered by a data carrier.

As already described above, every profiling tool is allotted a data carrier. Due to its size, however, the data carrier is not fixed firmly to the profiling tool, but together with a carrier body 3, forms a separate part, as shown in FIG. 1.

The basic shape of the carrier body 3 is cylindrical, its shell being interrupted at about mid-height by an annular groove. The data carrier 1 is arranged on an end face of the carrier body 3. When setting up the profiling tool on a machine tool, the carrier body 3 is attached to a control cabinet of the machine tool, being inserted in a socket 5 connected to an outer wall 6 of the control cabinet. Compression springs 8 and domed studs 9 are incorporated in the socket 5, the domed studs 9 being pressed into the annular groove of the carrier body 3, so that the carrier body is held under spring loading in the socket 5.

Fixed to the socket 5 is a holding stirrup 4, which carries the write/read unit 2. The write/read unit 2 is connected to an electronic control system 30 of the machine by cable 7. Inserted, the data carrier 1 contacts the write/read unit 2.

By scanning the data stored on the data carrier 1, the control system 30 checks the flawless functioning of the data transmission, and blocks the machine if this is not assured. Integrated in the tool 10 itself is a code bearer 23, shown in FIG. 2, in order to assure identification. The code bearer 23 permits a non-contact reading of the tool code.

By the physical separation of the tool 10 from the data carrier 1 there is a risk of these being separated from each other accidentally. On the long journey from the first application till the life's end of tool 10 after repeated use with several thousand dressing operations under the coarse operating conditions of large series manufacture, this might well happen, so that the aim of providing a gapless registration of tool use over the entire tool life is unattained. This danger is combatted according to the invention by means of a tool insertion catch in a tool transport box.

Figure 2:
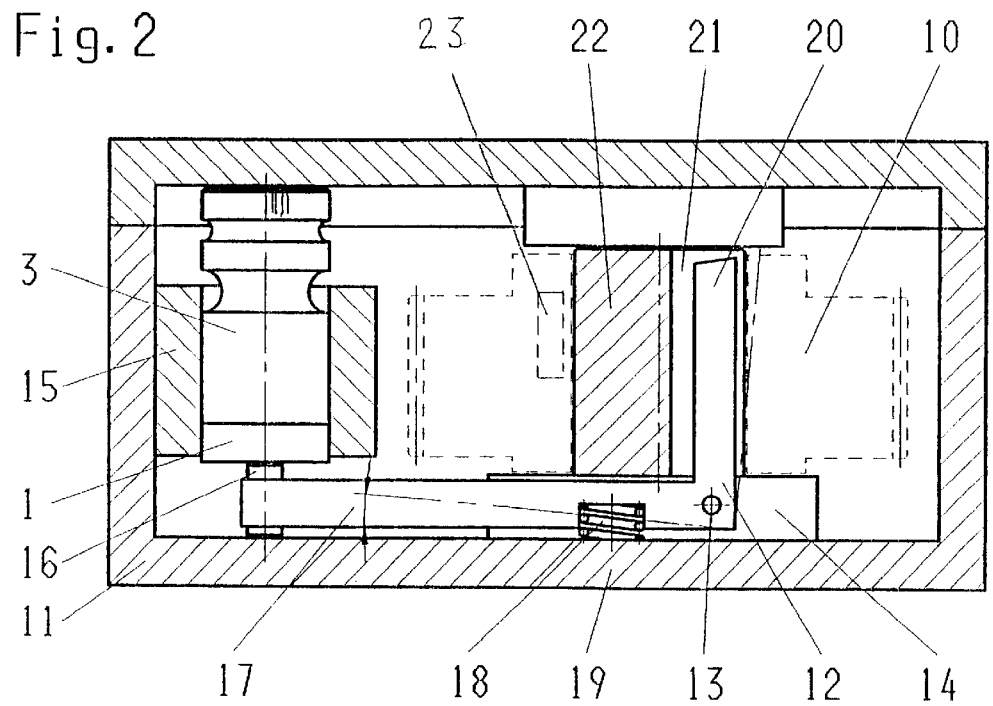

As shown in FIG. 2, the data carrier 1 with its carrier body 3 is stored and transported together with the tool 10 in a lockable transport box 11. The transport box 11 is provided with a tool support 14 with a cylindrical tool location stud 22, a holder 15 for accommodating the carrier body 3, and an elbow catch 12. The tool support 14 and the tool location stud 22 are fixed firmly to the box 11. The elbow catch 12 is connected to a bottom 19 of the box 11, being pivotable against the force of a spring 18 about a pin 13. It has two shanks, the first shank 17 being provided with a stud 16, and the second shank 20 engaging in an axially parallel radial slot 21 of the tool location stud 22.

When the carrier body 3 is pushed into its holder 15, its weight forces the stud 16 and hence the first shank 17 of the elbow catch 12 to the box bottom 19, against the force of the spring 18, thereby pulling the second shank 20 back into the radial slot 21 of the tool location stud 22, so that the tool 10 can be pushed unhindered onto the stud 22.

If, on the other hand, the carrier body 3 with the data carrier 1 is outside the box 11, the shank 20 is pivoted out, preventing the tool 10 from being pushed onto the stud 22. This described mechanism for the tool insertion catch is likewise to be regarded as just one example of various possible solutions.

The process and device according to the invention permit the registration of the state of wear of a tool without extravagant data determination and storage. By way of the common transport box it is moreover prevented that tool and data carrier become separated from each other.

List of Reference Symbols

1 Data carrier
2 Write/read unit
3 Carrier body
4 Holding stirrup
5 Fixture socket
6 Outer wall
7 Cable
8 Compression springs
9 Dome tipped stud
10 Tool
11 Transport box
12 Elbow catch
13 Pivot pin
14 Tool support
15 Holder
16 Stud
17 First shank
18 Spring
19 Box bottom
20 Second shank
21 Radial slot
22 Tool location stud
23 Code bearer
24 Grinding worm
30 Control system

What is claimed is:

1. A process for the registration of the state of wear of a tool used in gear manufacture, where the tool has at least one abrasive coated face for the machining of a workpiece or of a machining tool in a machining process, the process comprising determining a cutting distance travelled by the coated face of the tool, weighting said cutting distance, with a wear intensity factor to provide a weighted cutting distance, and comparing said weighted cutting distance with a specified life path constant, said life path constant being indicative of the maximum acceptable state of wear of the tool for the machining of the workpiece or of the machining tool, the resultant comparison being a measure for the state of the wear.

2. The process according to claim 1, further comprising using the wear intensity factor to take into consideration wear factors of a current machining process.

3. The process according to claim 1, further comprising considering, in order to determine the state of wear, tooth data and coating data of the tool and parameters of the machining process.

4. The process according to claim 1, further comprising determining, in the case of a gear shaped tool, the cutting distance travelled per tooth tip of the tool.

5. The process according to claim 4, further comprising calculating the cutting distance by way of a sum of infeed amounts, an infeed per tooth, and a thread length of the workpiece to be machined.

6. The process according to claim 4, further comprising calculating a piece potential and a residual piece potential of the tool, and performing said calculation on the basis of the process parameters proposed for the machining process, and also of those actually used for the machining case in question.

7. The process according to claim 1, further comprising calculating a relevant momentary profiling cutting distance as cutting distance travelled by the coating face of the tool, and distinguishing between pre-profiling and profiling cutting distances when determining the cutting distance travelled.

8. The process according to claim 1, further comprising determining the life path constant for a machining process empirically.

9. The process according to claim 1, further comprising calculating a total piece potential and a residual piece potential of the tool.

10. The process according to claim 1, further comprising registering parameters that influence the wear of the tool continuously by a machine control system while the tool is in use, and storing said parameters on an electronic data carrier which accompanies the tool throughout all its periods of use up to the end of its tool life.

11. The process according to claim 10, further comprising bringing, at the beginning of a period of use of the tool, the electronic data carrier into active connection with a write/read unit, and keeping said electronic data carrier connected to said write/read unit until the end of the relevant period of use.

12. The process according to claim 10, further comprising calculating the tool data of interest to a machine user, optionally the residual piece potential of the tool, by an evaluation programme from the data stored on the data carrier, and displaying said tool data on the monitor of the machine control system.

13. The process according to claim 10, further comprising keeping the data carrier fitted to a carrier body together with the tool in its transport box throughout its entire useful life until its failure, and providing an elbow catch which automatically prevents the placing of the tool in the transport box if the carrier body with the data carrier is not in its holder in the box.

14. A device for the registration of the state of wear of a tool used in gear manufacture, where the tool has at least one abrasive coated face for the machining of a workpiece or of a machining tool in a machining process, wherein the device comprises means for determining a cutting distance travelled per coated face of the tool, means for weighting the determined cutting distance with a wear intensity factor to provide a weighted cutting distance, and means for comparing said weight cutting distance, with a specified life path constant, this life path constant being indicative of a maximum acceptable state of wear of the tool for the machining of the workpiece or of the machining tool.

15. The device according to claim 14, wherein it comprises a data carrier, a write/read unit connected to a machine control system, and a carrier body, where the data carrier is fixed firmly to the carrier body, and where the data carrier is held constantly in touch contact with the write/read unit throughout an actual machining process.

16. The device according to claim 15, wherein it comprises a lockable transport box with a box bottom, a tool location stud connected firmly to the transport box by way of a tool support plate, a holder for accommodating the carrier body with the data carrier, an elbow catch pivot mounted in the tool support plate the elbow catch comprising a first shank pre-tensioned off the box bottom by means of a compression spring and a second shank, where, in the inserted state, the carrier body bears on the first shank so that the second shank engages in the axially parallel radial slot in the tool location stud, thus allowing the tool to be pushed onto the tool location stud.

* * * * *